United States Patent
Khoshnevis et al.

(10) Patent No.: US 9,247,508 B2
(45) Date of Patent: Jan. 26, 2016

(54) TRANSMISSION POWER CONTROL FOR SIGNALS USED BY USER EQUIPMENT TERMINALS FOR DEVICE-TO-DEVICE SERVICES

(71) Applicants: Ahmad Khoshnevis, Portland, OR (US); John Michael Kowalski, Camas, WA (US); Shohei Yamada, Camas, WA (US); Zhanping Yin, Vancouver, WA (US); Kenneth James Park, Cathlamet, WA (US)

(72) Inventors: Ahmad Khoshnevis, Portland, OR (US); John Michael Kowalski, Camas, WA (US); Shohei Yamada, Camas, WA (US); Zhanping Yin, Vancouver, WA (US); Kenneth James Park, Cathlamet, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 368 days.

(21) Appl. No.: 13/631,354

(22) Filed: Sep. 28, 2012

(65) Prior Publication Data

US 2014/0094213 A1 Apr. 3, 2014

(51) Int. Cl.
*H04W 52/00* (2009.01)
*H04W 52/38* (2009.01)
*H04W 52/36* (2009.01)

(52) U.S. Cl.
CPC ............ *H04W 52/383* (2013.01); *H04W 52/00* (2013.01); *H04W 52/367* (2013.01)

(58) Field of Classification Search
CPC .. H04W 52/383; H04W 52/00; H04W 52/367
USPC ............ 455/522, 69, 452.1, 452.2, 509, 464, 455/41.1, 41.2, 500, 67.11, 67.13; 370/281, 370/278, 324
See application file for complete search history.

(56) References Cited

U.S. PATENT DOCUMENTS

| 8,060,105 | B2 * | 11/2011 | Jung et al. | 455/452.2 |
| 8,112,108 | B2 | 2/2012 | Li et al. | |
| 8,270,337 | B2 * | 9/2012 | Yu et al. | 370/315 |
| 2009/0011770 | A1 | 1/2009 | Jung et al. | |
| 2012/0028672 | A1 | 2/2012 | Chen et al. | |

FOREIGN PATENT DOCUMENTS

JP 2009017560 A 1/2009

OTHER PUBLICATIONS

International Patent Application No. PCT/JP2013/005459, International Search Report mailed Oct. 29, 2013, 2 pages.

* cited by examiner

*Primary Examiner* — John J Lee
(74) *Attorney, Agent, or Firm* — Kilpatrick Townsend & Stockton LLP

(57) ABSTRACT

Methods, systems, and devices provide improved power control for signals used for device-to-device services. In one aspect, a user equipment ("UE") terminal controls the transmission power of signals used for device-to-device ("D2D") services based on power control parameters provided by a base station. The UE terminal includes a first power control module for controlling a first transmission power to be applied to signals used for communication with a base station. The UE terminal also includes a second power control module for controlling a second transmission power to be applied to signals used for D2D services. The first and second transmission powers can be determined based on at least one power control parameter received from the base station. The UE terminal also includes a signal transceiver module for transmitting signals used for uplink/downlink communications using the first transmission power and transmitting signals used for D2D services using the second transmission power.

18 Claims, 6 Drawing Sheets

TRANSMISSION POWER CONTROL FOR SIGNALS USED BY USER EQUIPMENT TERMINALS FOR DEVICE-TO-DEVICE SERVICES

TECHNICAL FIELD

The present disclosure relates generally to telecommunications and, more particularly, to improved transmission power control for signals used for device-to-device services.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station.

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals") from one user equipment terminal to one or more other user equipment terminals may not be communicated through a base station or other network control device of a telecommunication system.

Services that take advantage of D2D communication are referred to as proximity-based services ("ProSe") or D2D services. Such services typically include two phases: a discovery phase and a communication phase. The discovery phase involves the transmission and/or reception of discovery signals that allow user equipment terminals to detect when they are within proximity of each other. Proximity is determined when given proximity criteria are fulfilled. The communication phase involves the transmission and/or reception of communication signals directly between or among user equipment terminals. D2D services can also include other signaling phases involving signals such as sounding reference signals used to estimate the quality of communication channels, control signals used for establishing a communication channel, etc. The growing demand for increased speed, throughput, and efficiency in wireless communication networks requires continuing improvements in wireless communication processes, systems, and devices, including those related to D2D services and other D2D applications.

Prior solutions for control signaling between user equipment terminals of a telecommunication network involve a base station or other network control device of a telecommunication network generating or otherwise managing the control signaling. Depending on the level of control of the underlying telecommunication network (such as, but not limited to, an Evolved Universal Terrestrial Radio Access Network ("E-UTRAN")) control signaling related to the D2D discovery and/or communication may be managed or generated by a base station or other network control device. Such prior solutions do not provide for user equipment terminals managing transmission power for signals used for D2D discovery and/or communication. Such prior solutions also do not provide for management of transmission power levels in multiple, overlapping networks in which D2D communication links can be instantiated.

SUMMARY

Systems, devices, and methods for improving transmission power control for signals used in device-to-device services are described.

In one aspect, a user equipment terminal is provided. The user equipment terminal includes a first power control module, a second power control module, and a signal transceiver module. The first power control module is configured for controlling a first transmission power to be applied to at least one signal used for communication between the user equipment terminal and a base station. The first transmission power is determined based on at least one first power control parameter received from the base station. The second power control module is configured for controlling a second transmission power to be applied to at least one signal used by the user equipment terminal for device-to-device services. The second transmission power is determined based on at least one second power control parameter received from the base station. The signal transceiver module is configured to transmit the at least one signal used for communication between the user equipment terminal and the base station using the first transmission power and to transmit the at least one signal used for device-to-device services using the second transmission power.

In another aspect, a system is provided that includes a processor configured to execute one or more modules embodied in a non-transitory computer-readable medium. The one or more modules include a first power control module and a second power control module. The first power control module is configured for controlling a first transmission power to be applied to at least one signal used for communication between a user equipment terminal and a base station. The first transmission power is determined based on at least one first power control parameter generated by the base station. The second power control module is configured for controlling a second transmission power to be applied to at least one signal used by the user equipment terminal for device-to-device services. The second transmission power is determined based on at least one second power control parameter generated by the base station.

In another aspect, a base station is provided. The base station includes a first power control module, a second power control module, and a signal transceiver module. The first power control module is configured for generating at least one first power control parameter for controlling a first transmission power to be applied to at least one signal used for communication between a user equipment terminal and a base station. The second power control module is configured for generating at least one second power control parameter for controlling a second transmission power to be applied to at least one signal used by the user equipment terminal for device-to-device services. The signal transceiver module is configured to transmit the at least one first power control parameter and the at least one second power control parameter to the user equipment terminal.

In another aspect, a method is provided for controlling a transmission power to be applied to at least one signal used by a user equipment terminal for device-to-device services. The method involves the user equipment terminal receiving at least one power control parameter from a base station. The method further involves determining the transmission power to be applied to the signal used for device-to-device services based on the at least one power control parameter received from the base station. The method further involves the user equipment terminal transmitting the signal used for device-to-device services using the transmission power.

These illustrative aspects and features are mentioned not to limit or define the invention, but to provide examples to aid understanding of the inventive concepts described and disclosed herein. Other aspects, advantages, and features of the present invention will become apparent after review of the entire disclosure, including the accompanying figures and claims.

DETAILED DESCRIPTION

Figure 1:
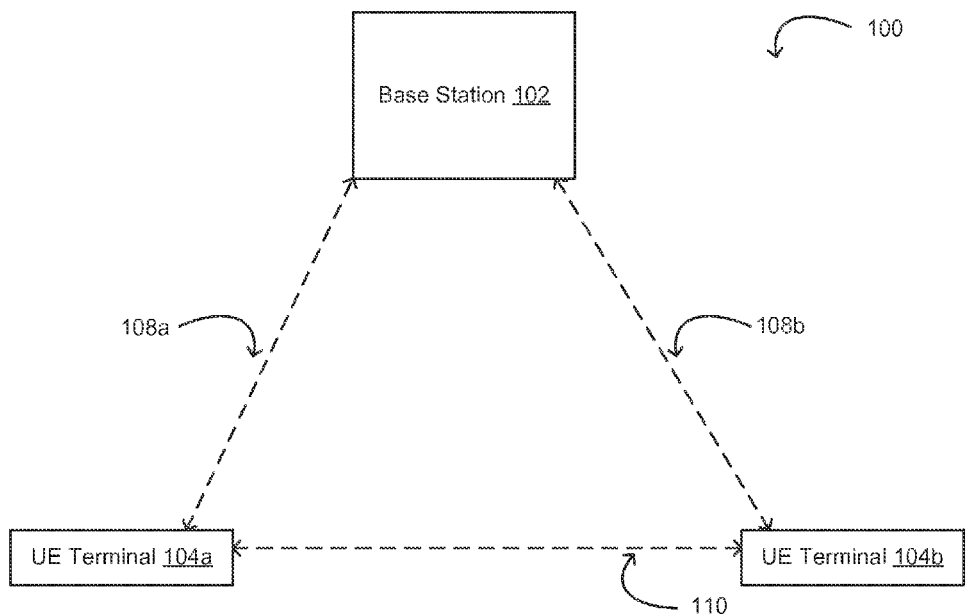
FIG. 1 is a block diagram illustrating an example telecommunication system including user equipment terminals enabled with device-to-device services according to exemplary embodiments of the present invention.

Certain aspects and examples are directed to systems and methods for performing transmission power control by user equipment terminals for device-to-device ("D2D") services, including transmission power control for D2D discovery signals and/or D2D communication signals. In some embodiments, a user equipment terminal (e.g., a mobile device) can include one or more power control modules for controlling the transmission power to be applied to signals used for D2D services. The power control modules for D2D services are separate, at least functionally, from power control module(s) used for transmission power control of uplink communication and/or downlink communication between the user equipment terminal and a base station or other network control device configured to perform centralized processing, scheduling or other management of communications in a telecommunications network. The one or more power control modules for D2D communication can control the transmission power of signals transmitted by the user equipment terminal for device-to-device communication.

One example of a signal used by user equipment terminals for D2D services is a discovery signal used to discover other user equipment terminals. A discovery signal can include one or more signals allowing discovery of a network device. A discovery signal can be broadcasted or otherwise transmitted. Another example of a signal used by user equipment terminals for D2D services is a sounding reference signal used to estimate the quality of communication channels. Another example of a signal used by user equipment terminals for D2D services is a communication signal for transmission of communication data (e.g., voice or non-voice data) between user equipment terminals. Another example of a signal used by user equipment terminals for D2D services is a control signal used for establishing a communication channel, such as (but not limited) power control parameters or identification of frequencies used to establish a communication channel.

As used herein, the term "device-to-device ("D2D") communication" can refer to a mode of communication between or among user equipment terminals that operate on a cellular network or other telecommunications system in which the communication data traffic from one user equipment terminal to another user equipment terminal does not pass through a centralized base station or other device in the cellular network or other telecommunications system. Communication data is sent using communication signals and can include voice communications or data communications intended for consumption by a user of a user equipment terminal. Communication signals may be transmitted directly from a first user equipment terminal to a second user equipment terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

D2D communication can be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication can be used.

As used herein, the term "licensed frequency spectrum" can include a frequency spectrum for which usage is regulated by a governing agency. In some aspects, a licensed frequency spectrum can refer to an allocation of spectrum that is licensed by government regulatory authorities and where access to and use of the spectrum in a particular domain are controlled by a licensee, such as (but not limited to) a cellular carrier. Licensees of a frequency spectrum can include governmental agencies, private entities such as (but not limited to) cellular carriers, etc. For example, in the United States, a licensed frequency spectrum can include frequencies used for communication that are regulated by the Federal Communication Commission. For example, various portions of a licensed frequency spectrum can be designated for military use, public safety, and commercial services. Only the entities entitled to do so may use the frequency bands of a respective portion of a licensed frequency spectrum. Examples of commercial use can include broadband wireless use, Personal Communications Services ("PCS") cellular use, broadband radio services, etc.

As used herein, the terms "D2D services," "proximity services" or "ProSe" can refer to systems and methods for implementing D2D discovery and/or D2D communication, in a telecommunications system.

As used herein, the term "user equipment ("UE") terminal" can refer to an electronic device used to communicate voice and/or data via a telecommunications system, such as (but not limited to) a cellular network. Other terminology used to refer to UE terminals and non-limiting examples of such devices can include mobile station, mobile device), access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "base station" can refer to any device or group of devices that facilitates wireless communication or otherwise provides an interface between a UE terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for UE terminals to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10 and/or 11), the scope of the present disclosure should not be limited in this regard. At least some aspects of the systems and methods disclosed herein may be utilized in other types of wireless communication systems.

As used herein, the term "telecommunication system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMT-Advanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, the terms "D2D discovery," "proximity discovery" and "ProSe Discovery" can refer to a process for determining that a first UE terminal is in proximity to a second UE terminal.

As used herein, the terms "D2D communication," "proximity communication" and "ProSe communication" can refer to a process for establishing and using a communication channel between a UE terminal and one or more other network devices in its proximity.

In accordance with one embodiment, a UE terminal can control the transmission power of signals used for D2D services based at least partially on power control parameters provided by a base station. The UE terminal can include a first power control module configured for controlling a first transmission power to be applied to signals used for communication with a base station. The UE terminal can also include a second power control module configured for controlling a second transmission power to be applied to signals used for D2D discovery and/or communication. The first and second transmission powers can be determined based on at least one power control parameter received from the base station or another network control device. In some embodiments, a power control parameter provided by a base station or other network control device cannot be overridden by a UE terminal or applications executed by the UE terminal. In other embodiments, a value for a power control parameter provided by a base station or other network control device can be overridden by a UE terminal or applications executed by the UE terminal if the value for the power control parameter set by the UE terminal is within a range specified by the base station or other network control device. In some embodiments, power control parameters used for D2D services may differ from power control parameters used for uplink and downlink communication between the UE terminal and a base station. In other embodiments, the same power control parameters can be used for D2D discovery, D2D communication, and uplink/downlink communications with the base station. The UE terminal can also include a signal transceiver module configured to transmit signals used for uplink/downlink communications using the first transmission power and to transmit signals used for D2D discovery and/or communication using the second transmission power.

In additional or alternative embodiments, one or more power control parameters can be set by applications, devices, and/or entities other than the base station. In one example, an operator associated with a specific telecommunication service or a UE manufacturer can set the one or more power control parameters for UE terminals via operations administration and maintenance procedures or by storing the power control parameter(s) in a subscriber identification module of a UE terminal.

The power control module for D2D services can execute one or more power control procedures that are independent from power control procedures used for uplink and/or downlink communication between the UE terminal and the base station. D2D channels between UE terminals can be different from uplink and downlink channels between the UE terminal and the base station. Thus, using independent power control procedures for D2D services can provide greater capacity per unit area for D2D services and optimize power usage and battery life of a UE terminal.

In some embodiments, the discovery phase and communication phase of a D2D service can be separate processes. For example, discovery of other UE terminals by a given UE terminal may not result in D2D communication among the discovering UE terminal and the discovered UE terminals. In other embodiments, the communication phase may not be completely separate from the discovery phase. For example, a UE terminal may periodically broadcast both its identity for discovery purposes and payload data (such as advertising) for communication purposes. The UE terminal may not establish a persistent communication link with and/or authenticate itself to neighboring UE terminals.

In additional or alternative embodiments, power control parameters from a base station can include a maximum power for the D2D discovery signal and/or D2D communication signals. The maximum power can be an upper limit on the power that the UE terminal can allocate to transmission of such signals. The power control module for D2D services can determine the transmission power of a signal used for D2D services by determining the minimum of the maximum power for the signal and the sum of an initial power and a power adjustment by the power control module for D2D services.

In some embodiments, the maximum power that the UE terminal can allocate to transmission of signals used for D2D services can be determined based on a minimum power threshold and a maximum power threshold. The maximum power threshold can be a minimum value of several power control parameters, such as a maximum power set by a base station or other network control device, a maximum power set by a user of a UE terminal, and/or a maximum power determined by the UE terminal category. Using the minimum value of several power control parameters can ensure that the maximum power threshold does not exceed a maximum power value set by the base station. The minimum power threshold can be determined by the power control module based on performance requirements for the UE terminal. Non-limiting examples of performance requirements include a minimum or guaranteed transmission range, a bit error rate, a probability of detection, a probability of false alarm or other erroneous discovery of other UE terminals, a discovery delay requirement, etc. The minimum power threshold can be the difference between the upper power threshold and the maximum amount of power reduction that the UE terminal can apply. The maximum amount of power reduction can be an additional power control parameter provided by a base station or other network control device.

In other embodiments, the maximum power that the UE terminal can allocate to transmission or broadcasting of D2D service signals can be selected based on a single power parameter. For example, the maximum power can be equal to the maximum power set by the base station.

A power control module can select the initial power for D2D service signals based on one or more power control parameters. In some embodiments, the initial power can be set by base station or other network control device. In other embodiments, the initial power can be set by a user or an application executed by the UE terminal. In other embodiments, the initial power can have a default value. The power control module for D2D services may set the initial power to the minimum of an initial power value set by the base station and an initial power value set by the UE terminal. In other embodiments, the initial power can be a fixed value set by the base station, by a manufacturer of a UE terminal, by an operator using the telecommunication system, etc.

In some embodiments, the power adjustment for D2D service signals can be configured by a base station or other network control device. In one example, the base station or other network control device may signal a UE terminal to adjust the power by a specified power adjustment. The specified power adjustment can be suggested by the base station or other network control device or be a pre-determined value set by the service provider or device manufacturer. In other embodiments, the power adjustment can be set by an application executed at a UE terminal.

In additional or alternative embodiments, the transmission power applied to signals used for D2D services can be determined based on a frequency bandwidth of a signal transmitted by the UE terminal.

In some embodiments, a power control module for D2D discovery may be the same as a power control module for D2D communication or other signals used for D2D services. If the power control module for D2D discovery is the same as the power control module for D2D communication, one set of parameters and configurations can be used for transmission power control of both D2D discovery and D2D communication. In other embodiments, a power control module for D2D discovery may be independent of the power control module for D2D communication and each module can use the same or different power control parameters and configurations.

In one embodiment, transmission power control for D2D services may be implemented using an open loop power control procedure. For open loop power control, no feedback may be provided from the receiver UE terminal to the transmitter UE terminal. The transmitter UE terminal adjusts transmission power without accounting for whether the transmitted signal is received by the receiver. For example, the transmitter UE terminal may broadcast discovery and/or communication signals that are not targeted to a specific receiver UE terminal or a group of receiver UE terminals. Thus, the transmitter UE terminal may lack information regarding the physical communication channels available for communicating with other UE terminals, which may necessitate the use an open loop power control procedure.

In another embodiment, transmission power control for D2D services may be implemented using a closed loop power control procedure. For closed loop power control, feedback may exist from the receiver UE terminal to the transmitter UE terminal. The transmitter UE terminal can adjust transmission power based on the channel condition between the transmitter UE terminal and the receiver UE terminal or based on an acknowledgement and/or negative acknowledgement received from the receiver UE terminal. For example, a transmitter UE terminal may have information regarding the physical communication channels available for communicating with other UE terminals. A closed loop power control procedure can provide more effective usage of a communication channel in terms of power consumption, capacity per unit area, etc.

Detailed descriptions of the above-described aspects and examples, as well as additional aspects and examples, are discussed below. The illustrative examples described herein are not intended to limit the scope of the disclosed concepts. The following description makes reference to the attached drawings in which like numerals indicate like elements, and directional descriptions are used to describe the illustrative aspects but, like the illustrative aspects, should not be used to limit the present invention.

FIG. 1 is a block diagram illustrating an example telecommunication system 100 including user equipment terminals enabled with device-to-device services according to certain exemplary embodiments.

The telecommunication system 100 can include a base station 102 and two or more UE terminals 104a, 104b. The base station 102 can respectively communicate with the UE terminals 104a, 104b via the respective communication links 108a, 108b. The communication links 108a, 108b can be established via any suitable method for communicating between a base station and a UE terminal in a service coverage area serviced by the base station. Each of the communication links 108a, 108b can include uplink and downlink channels. In some embodiments, the communication links 108a, 108b need not be physical links between the base station 102 and the UE terminals 104a, 104b. For example, one or more of the communication links 108a, 108b may include transmission points for physically transmitting signals from the base station 102 to the UE terminals 104a, 104b. A transmission point may not be geographically co-located with the base station 102.

The D2D communication link 110 can provide a direct link between the UE terminals 104a, 104b. The D2D communication link 110 can enable the UE terminals 104a, 104b to exchange communication data without routing the communication data through base station 102 or other infrastructure of the telecommunication system 100. In some aspects, the UE terminals 104a, 104b can establish a D2D communication link 110 via a licensed frequency spectrum. In other aspects, the UE terminals 104a, 104b can establish a D2D communication link 110 via a suitable unlicensed frequency spectrum. Non-limiting examples of a communication link 110 via an unlicensed frequency spectrum include a WLAN link, a Bluetooth link, etc. Specific examples of establishing a D2D link are described in commonly-assigned U.S. patent application Ser. No. 13/408,910, titled "Allocating and Determining Resources for a Device-to-Device Link," by Khoshnevis et al., and U.S. patent application Ser. No. 13/560,725, titled "Proximity Service Discovery Using a Licensed Frequency Spectrum," by Yamada et al., each of which is hereby incorporated by reference in its entirety and for all purposes. Establishing the D2D communication link 110 may include determining that the UE terminals 104a, 104b are in sufficient proximity to one another.

Figure 2:
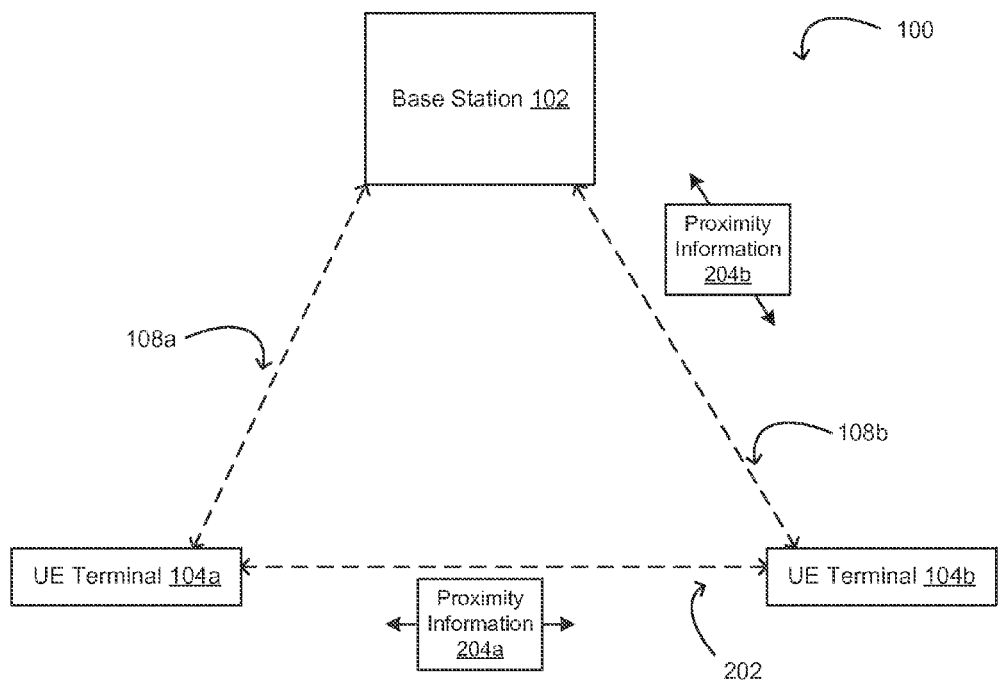
FIG. 2 is a block diagram illustrating an example telecommunication system and showing user equipment terminals engaged in device-to-device discovery according to exemplary embodiments of the present invention.

FIG. 2 is a block diagram illustrating the telecommunication system 100 and showing user equipment terminals engaged in proximity service discovery.

Determining that two or more peers are in sufficient proximity to one another (i.e., proximity discovery) can include exchanging information via multiple protocol layers. A peer can include (but is not limited to) a device communicating with another peer device and/or an application communication with another application. Each layer may have different lengths or types of identity information for different peers. A discovering or discovered peer can be a UE terminal, a base station, a network, a server, or an application, etc. The layer used to identify a discovered peer can determine which peer is a discovering or discovered peer. The layer used for a discovery can determine which of a UE terminal, a base station, a network, a server, or an application is a discovering or discovered peer.

In some aspects, discovery of a UE terminal can include using a signaling path 202 directly between two or more UE terminal 104a, 104b (i.e., the signaling path does not pass through a base station 102. The direct signaling path may be used to communicate proximity information 204a between a discovered UE terminal, such as the UE terminal 104a, and the discovering UE terminal, such as the UE terminal 104b, using D2D discovery signal(s). The direct signaling path 202 can be established via a licensed frequency spectrum or a suitable unlicensed frequency spectrum. The direct signaling path 202 can include resources of the telecommunication system 100 that are allocated to or otherwise used by a device, such as the UE terminal 104a, for broadcasting or otherwise transmitting a discovery signal. For example, the UE terminal 104b can continuously scan frequencies of a frequency spectrum for discovery signal broadcast by the UE terminal 104a. In other aspects, discovery of a UE terminal can include communicating proximity information 204b via a communication link 108b between the base station 102 and the discovering UE terminal 104b. In other aspects, discovery of a UE terminal can include using a communication link 108a between a base station 102 and the discovering UE terminal 104a.

In some aspects, the base station 102 can determine the geographic location of UE terminals 104a, 104b using triangulation of signals or other network-based methods. The geographic location of UE terminals 104a, 104b can be used to determine whether they are in sufficient proximity for engaging in D2D communication with each other. For example, devices in the telecommunication system 100 may determine the location of the UE terminal based on the delay of signals sent between the UE terminal and the closest wireless access point(s), base station(s), etc. In such cases, the geographical position of the UE terminal is determined through various techniques like triangulation, time difference of arrival ("TDOA") or Enhanced Observed Time Difference ("E-OTD"). Those skilled in the art will appreciate that any other location-based service technology may be used. Examples of such other technologies include: Near LBS ("NLBS"), in which local-range technologies such as Bluetooth, WLAN, infrared and/or RFID/Near Field Communication technologies are used to determine the position of a communication device; the use of operator-independent location data provided in telecommunication signaling protocols such as SS7; and Local Positioning Systems such as Co-Pilot Beacon for COMA networks, Bluetooth, UWB, RFID, Wi-Fi and WiMAX.

In other aspects, the base station 102 can determine the location of UE terminals 104a, 104b based on location information received from the UE terminals. Location information can be generated using global positioning systems ("GPS") or other location-based services. For example, location-based services may include a GPS chip and associated software or firmware for monitoring the location of the caller device using a global positioning system. Additionally or alternatively, the location-based services may include software used to monitor signals generated and/or received by the UE terminal 104a when it communicates with other devices (e.g., wireless access points, base stations, etc.) in the telecommunication system 100. The signals may provide or may be used to provide an indication of the geographical location of the UE terminal 104a at a particular time, such as by triangulation or techniques like TDOA, E-OTD, etc.

Figure 3:
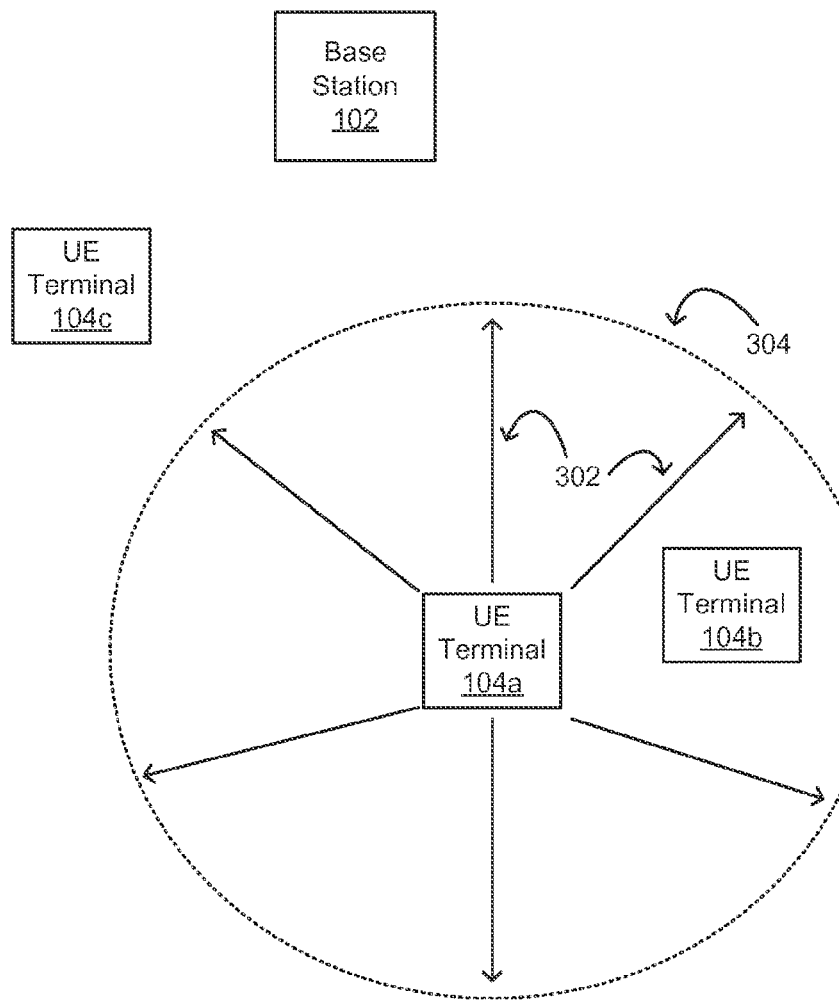
FIG. 3 is a modeling diagram illustrating an example of a user equipment terminal broadcasting or otherwise transmitting a discovery signal according to exemplary embodiments of the present invention.

FIG. 3 is a modeling diagram illustrating an example of a user equipment terminal broadcasting or otherwise transmitting a discovery signal 302. Proximity-based discovery can include using a physical layer signal, such as a discovery signal 302, to check reachability and proximity between a discovered UE terminal 104a and a discovering UE terminal 104b. The physical layer signal can be a radio signal from a discovered UE terminal 104a that can be discovered using a discovery signal transmission procedure.

For example, a UE terminal 104a that is capable of being discovered can transmit the discovery signal 302, such as by way of a radio signal broadcast. By broadcasting the discovery signal 302 in this manner, the UE terminal 104a can be discovered by a discovering UE terminal within a sufficient proximity of the discovered UE terminal 104a to receive or otherwise detect the discovery signal 302. A discovering UE terminal 104b can be within a radius 304 in which the discovery signal 302 can be detected and can thereby be located within a sufficient proximity of a discovered UE terminal 104a. A UE terminal 104c can be located outside the radius 304 in which the discovery signal 302 can be detected, preventing the UE terminal 104c from discovering the UE terminal 104a. In additional or alternative aspects, the discovered UE terminal 104a can be discovered by a base station that senses the discovery signal 302. Examples of discovery signal 302 can include (but are not limited to) a proximity services beacon, an LTE uplink reference signal, an LTE downlink reference signal, etc. It is to be understood that not all three devices 104a, 104b, and 104c in the example of FIG. 3 need be mobile devices.

In some aspects, the discovery signal 302 may provide information and/or structure to identify a UE terminal 104a. Such information can include, for example, a unique identifier assigned to the UE terminal 104a. In other aspects, the discovery signal 302 may provide information and/or structure to identify a type of discovery to be used by the UE terminals 104a, 104b. Non-limiting examples of types of discovery can include physical layer discovery, network access layer discovery, and application services layer discovery.

In other aspects, the discovery signal 302 may provide information and/or structure to identify an estimated channel quality or channel state of a communication channel that can be used as the D2D communication channel 110. For example, the discovery signal 302 can include a sounding reference signal to be used to estimate a channel quality (e.g., reception power, estimated path loss, estimated signal-to-noise ratio, estimated reception quality, pre-coding matrixes, estimated rank used for spatial multiplexing, etc.). Estimating a channel quality can include transmitting a known signal, such as a sounding reference signal, by a transmitter, receiving the sounding reference signal by a receiver, and performing channel estimation algorithm such as (but not limited to) mean squared error ("MSE") estimation on the received signal.

In some aspects, a discovery phase and a communication phase for D2D services can be separate processes. For example, discovery of a UE terminal 104b by a UE terminal 104a may not result in D2D communication between the discovered UE terminal 104a and the discovering UE terminal 104b or D2D communication may occur only after D2D discovery is completed and confirmed. In other aspects, the D2D communication phase may not be completely separate from the discovery phase. For example, a UE terminal 104a may periodically broadcast, via the signal 302, both the identity of the UE terminal 104a for discovery purposes and payload data (such as advertising or other broadcast messages) for communication purposes. The UE terminal 104a may not establish a persistent communication link with a UE terminal 104b or provide authentication information to UE terminal 104b.

Figure 4:
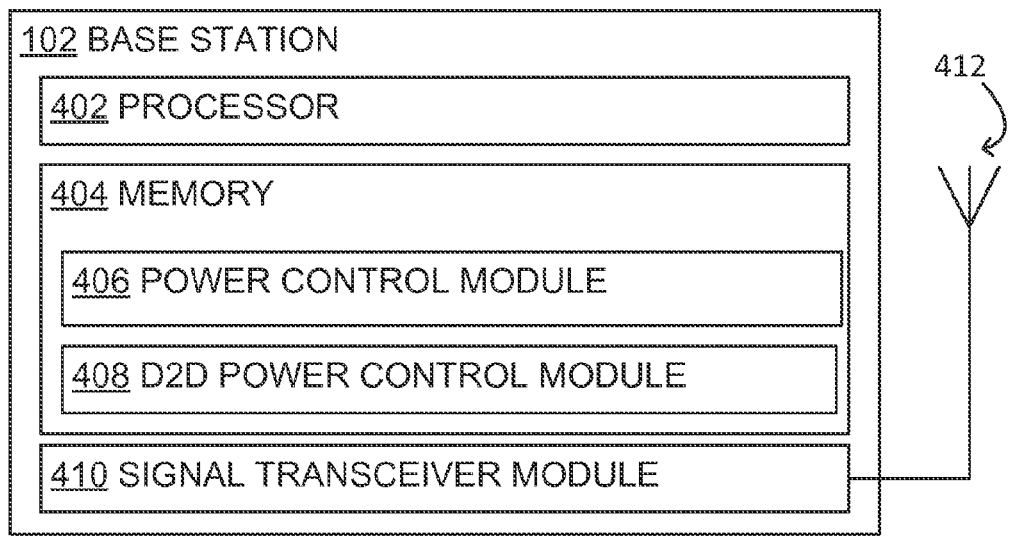
FIG. 4 is a block diagram depicting an example base station configured for controlling transmission power of signals used for device-to-device services according to exemplary embodiments of the present invention.

FIG. 4 is a block diagram depicting an example base station 102 configured for controlling transmission power of signals used for D2D services.

To implement the functionality described herein, the base station 102 can include a processor 402 that can execute code stored on a computer-readable medium, such as a memory 404, to cause various modules in the base station 102 to control or otherwise manage transmission power of signals used for D2D services by UE terminals in the telecommunication system 100. Non-limiting examples of a processor 402 include a microprocessor, a peripheral interface controller ("PIC"), an application-specific integrated circuit ("ASIC"), a field-programmable gate array ("FPGA"), or other suitable processor. The processor 402 may include one processor or any number of processors.

The processor 402 can access instructions stored in memory 404. The memory 404 may be any non-transitory computer-readable medium capable of tangibly embodying instructions and can include electronic, magnetic, or optical devices. Examples of the memory 404 include random access memory ("RAM"), read-only memory ("ROM"), magnetic disk, an ASIC, a configured processor, or other storage device. Instructions can be stored in the memory 404 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The base station 102 can also include a power control module 406. The power control module 406 can include any device or group of devices and/or any suitable software for generating one or more power control parameters for controlling a transmission power to be applied to signals used for communication between one or more of the UE terminals 104a, 104b and the base station 102, as explained in more detail below with respect to FIGS. 6 and 7.

The base station 102 can also include a D2D power control module 408. The D2D power control module 408 can include any device or group of devices and/or any suitable software for generating one or more power control parameters for controlling a transmission power to be applied to signals used for D2D services between UE terminals 104a, 104b, as explained in more detail below with respect to FIGS. 6 and 7.

The base station 102 can also include a signal transceiver module 410. The signal transceiver module 410 can include a transmitter component and a receiver component. The signal transceiver module 410 can prepare signals for transmission to the UE terminals 104a, 104b or to other base stations via the antenna 412. Preparing signals for transmission can include, for example, modulating carrier signals to transmit the data. Any suitable modulation technique can be used to modulate the carrier signals, such as (but not limited to) phase shift modulation ("PSK"), quadrature amplitude modulation ("QAM"), etc. The signal transceiver module 410 can transmit and receive signals via the antenna 412. Signal can be transmitted and received using a licensed frequency spectrum or a suitable unlicensed frequency spectrum.

The example configuration for the base station 102 is provided to illustrate configurations of certain aspects. Other configurations may of course be utilized. Although the power control module 406, the D2D power control module 408, and the signal transceiver module 410 are depicted in FIG. 4 and described herein as separate physical or logical modules for ease of reference, other implementations are possible. In additional or alternative aspects, two or more of the power control module 406, the D2D power control module 408, and/or the signal transceiver module 410 can be implemented via common devices, groups of devices, and/or software engines. Other aspects and alternative embodiments for the base station 102 are described in the above-referenced commonly-assigned U.S. patent application Ser. No. 13/408,910, titled "Allocating and Determining Resources for a Device-to-Device Link," by Khoshnevis et al. and U.S. patent application Ser. No. 13/560,725, titled "Proximity Service Discovery Using a Licensed Frequency Spectrum," by Yamada et al., each of which are incorporated herein by reference.

Figure 5:
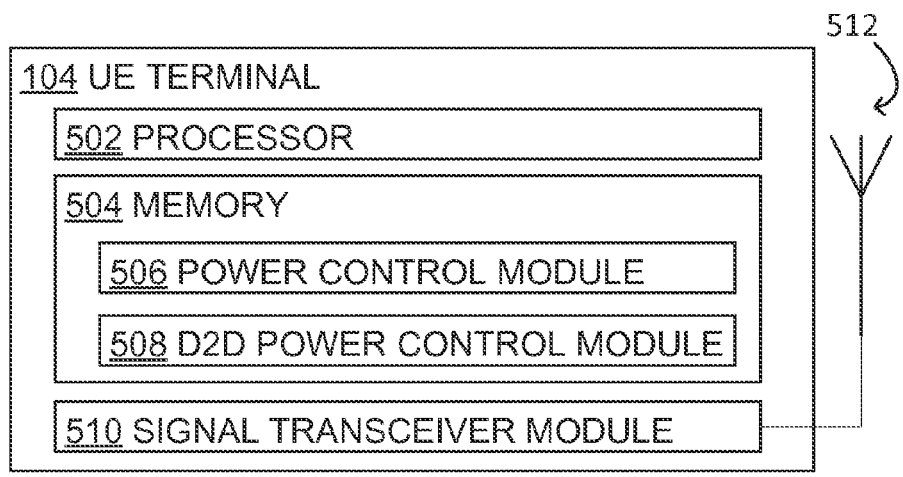
FIG. 5 is a block diagram depicting an example user equipment terminal configured for controlling transmission power of signals used for device-to-device services according to exemplary embodiments of the present invention.

FIG. 5 is a block diagram depicting an example UE terminal 104 configured for controlling transmission power of signals used for D2D services.

The UE terminal 104 includes a processor 502 that can execute instructions stored on a computer-readable medium, such as a memory 504, to cause the UE terminal 104 to control or otherwise manage transmission power of signals used for D2D services. Non-limiting examples of a processor 502 include a microprocessor, a peripheral interface controller ("PIC"), an application-specific integrated circuit ("ASIC"), a field-programmable gate array ("FPGA"), or other suitable processor. The processor 502 may include one processor or any number of processors.

The processor 502 can access instructions stored in memory 504. The memory 504 may be any non-transitory computer-readable medium capable of tangibly embodying instructions and can include electronic, magnetic, or optical devices. Examples of the memory 504 include random access memory ("RAM"), read-only memory ("ROM"), magnetic disk, an ASIC, a configured processor, or other storage device. Instructions can be stored in the memory 504 as executable code. The instructions can include processor-specific instructions generated by a compiler and/or an interpreter from code written in any suitable computer-programming language, such as C, C++, C#, Visual Basic, Java, Python, Perl, JavaScript, and ActionScript.

The UE terminal 104 can also include a power control module 506. In some aspects, the power control module 506 can control the transmission power to be applied to signals used for communication between the UE terminal 104 and the base station 102, as explained in more detail below with respect to FIGS. 6 and 7. The power control module 506 can determine the transmission power based on one or more power control parameters received from the base station 102.

The UE terminal 104 can also include a D2D power control module 508. The D2D power control module 508 can control the transmission power to be applied to signals used for D2D services, as explained in more detail below with respect to FIGS. 6 and 7. The D2D power control module 508 can determine the transmission power based on one or more power control parameters received from the base station 102.

The UE terminal 104 can also include a signal transceiver module 510. The signal transceiver module 510 can include a transmitter component and a receiver component. The signal transceiver module 510 can prepare signals for transmission to the base station 102 or for reception by other UE terminals 104a, 104b via the antenna 512. Preparing signals for transmission can include, for example, modulating carrier signals to transmit the data. Any suitable modulation technique can be used to modulate the carrier signals, such as (but not limited to) phase shift modulation ("PSK"), quadrature amplitude modulation ("QAM"), etc. The signal transceiver module 510 can transmit and receive signals via a licensed frequency spectrum or a suitable unlicensed frequency spectrum.

Although the power control module 506, the D2D power control module 508, and the signal transceiver module 510 are depicted in FIG. 5 and described herein as separate physical or logical modules for ease of reference, other implementations are possible. In additional or alternative aspects, two or more of the power control module 506, the D2D power control module 508, and/or the signal transceiver module 510 can be implemented via common devices, groups of devices, and/or software engines.

Figure 6:
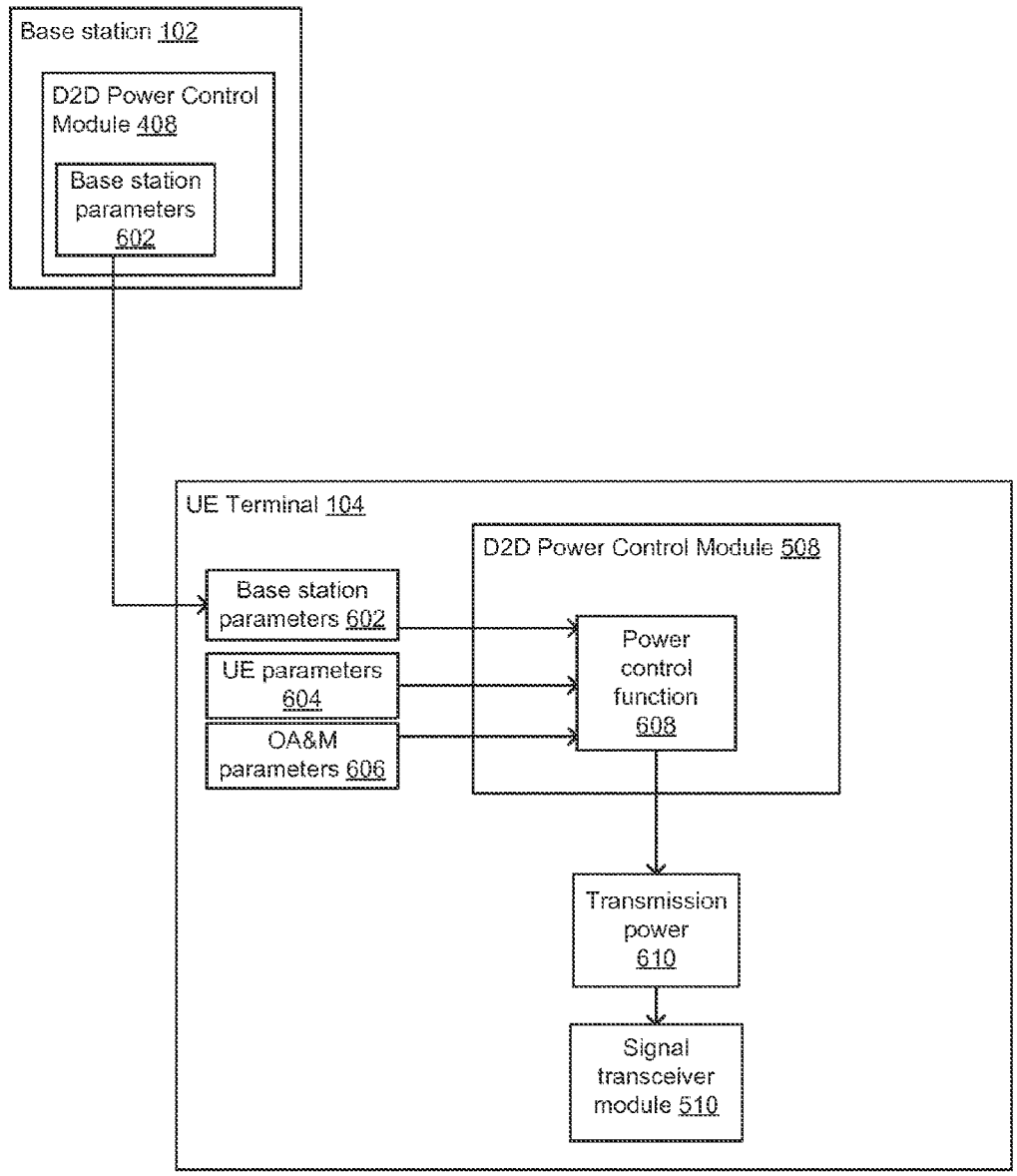
FIG. 6 is a modeling diagram illustrating an example signal flow for a transmission power control procedure executed by a user equipment terminal for device-to-device services according to exemplary embodiments of the present invention.

A UE terminal 104 can control the transmission power of signals used for D2D services based at least partially on power control parameters provided by a base station 102. FIG. 6 is a modeling diagram illustrating an example flow of communications for a power control procedure executed by a UE terminal 104 for D2D services.

The base station 102 or another network control device can provide one or more power control parameters, referred to herein as "base station parameters" 602 to the UE terminal 104. The base station parameters 602 cannot be overridden by the UE terminal 104 or applications executed by the UE terminal 104. In some aspects, the base station parameters 602 used for D2D services may differ from other power control parameters provided by the base station 102 or another network control device used for uplink and downlink communication between the UE terminal 104 and a base station 102, such as communication via the communication links 108a, 108b. In other aspects, the same power control parameters can be used for both D2D services and uplink/downlink communications with the base station 102.

The D2D power control module 406 of the base station 102 can generate the base station parameters 602 based on any suitable criteria. In one example, the D2D power control module 406 can determine a maximum power for a UE terminal 104 based on a specified transmission range of the UE terminal 104. In another example, the D2D power control module 406 can determine a maximum power for a UE terminal 104 based on a desired frequency reuse amount for a cell serviced by the base station 102. The desired frequency reuse amount can be set or determined by an operator using the telecommunication system 100 or the core network for the telecommunication system 100. In another example, the D2D power control module 406 can determine a maximum power for a UE terminal 104 based on a telecommunication standard, such as 3GPP, utilized by the base station 102 and the UE terminal 104.

In additional or alternative embodiments, the power control module 404 of the base station 102 and the D2D power control module 406 may generate independent power control parameters for uplink/downlink communication and D2D services, respectively. For example, one or more power control parameters generated by the power control module 404 may specify a maximum transmission power for uplink/downlink communication between the UE terminal 104 and the base station 102. One or more additional power control parameters generated by the D2D power control module 406 may specify a different maximum transmission power for D2D services. The maximum transmission power for uplink/downlink communication can be greater than a maximum power maximum transmission power for D2D services.

In some embodiments, one or more power control parameters can be set by applications, devices, and/or entities other than the base station 102. As depicted in FIG. 6, the UE terminal 104 can also determine a transmission power 610 used for D2D services based on as one or more power control parameters stored in the memory 504 of the UE terminal (referred to herein as "UE parameters") 604 and/or one or more power control parameters set through Operations, Administration, and Maintenance ("OA&M") procedures (referred to herein as "OA&M parameters") 606.

The UE parameters 604 can include one or more parameters configurable via the UE terminal 104 or an application executed at the UE terminal 104. In some aspects, the UE parameters 604 can include user-specified power settings for the UE terminal 104. In other aspects, the UE parameters 604 can include performance requirements specified by an application executed at the UE terminal 104. Non-limiting examples of performance requirements include a minimum or guaranteed transmission range, a bit error rate, a probability of detection, a probability of false alarm, a discovery delay requirement, etc.

The OA&M parameters 606 can include one or more parameters configurable or configured by the core network of the telecommunication system 100, an operator of a telecommunication service using the telecommunication system 100, and/or a manufacturer of a UE terminal 104. In one example, an operator associated with a specific telecommunication service can set OA&M parameters 606 for UE terminals using signals transmitted through the telecommunication system 100. The OA&M parameters 606 can be provided to the UE terminal 104 by the operator via the base station 102 or another network control device. In another example, a manufacturer of the UE terminal 104 can set OA&M parameters 606. The OA&M parameters 606 can be stored in the memory 504 (e.g., RAM, ROM, SIM card, etc.) of the UE terminal 104.

The D2D power control module 508 can execute one or more power control procedures for determining a transmission power 610. A power control procedure can include execution of a power control function 608. Inputs to the power control function 608 can include one or more of the base station parameters 602, the UE parameters 604, and the OA&M parameters 606. The signal transceiver module 510 of the UE terminal 104 can be configured to transmit signals for D2D services using the transmission power 610 as determined by the D2D power control module 508.

As described above, the D2D power control module 508 may determine the transmission power 610 using an open loop power control procedure or a closed loop power control procedure. For open loop power control, no feedback may be provided from the receiver UE terminal to the transmitter UE terminal 104. The transmitter UE terminal 104 determines transmission power for signals used for D2D services without accounting for whether the transmitted signal is received by the receiver UE terminal.

In another embodiment, the D2D power control module 508 may determine the transmission power 610 using a closed loop power control procedure. For closed loop power control, feedback may exist from the receiver UE terminal to the transmitter UE terminal 104. The transmitter UE terminal 104 can adjust transmission power used for signals for D2D services based on the channel condition between the transmitter UE terminal and the receiver UE terminal or based on the acknowledgement and/or negative acknowledgement received from the receiver.

Figure 7:
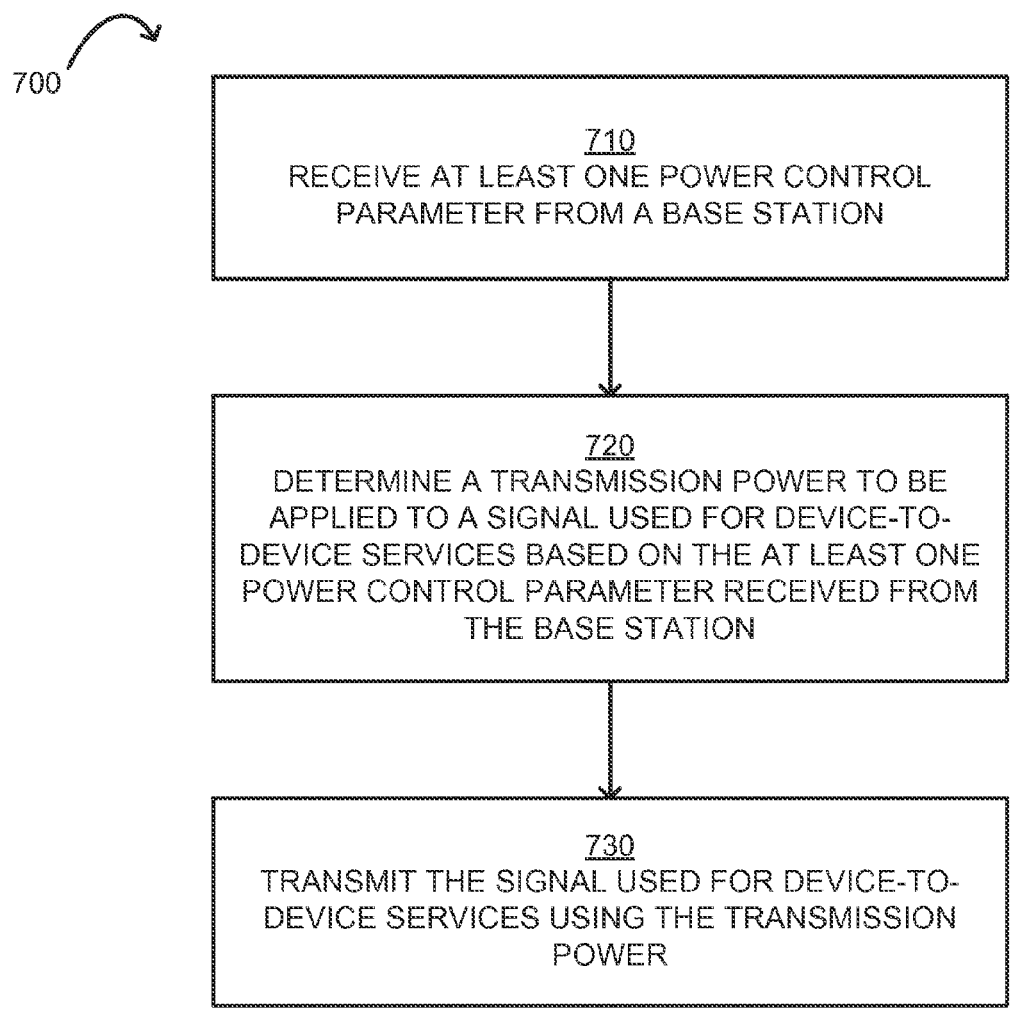
FIG. 7 is a flow chart illustrating an example method for controlling a transmission power to be applied to a signal used by a user equipment terminal for device-to-device services according to exemplary embodiments of the present invention.

FIG. 7 is a flow chart illustrating an example method 700 for controlling a transmission power 610 to be applied to a signal used for D2D services. For illustrative purposes, the method 700 is described with reference to the exemplary system implementations depicted in FIGS. 4 and 5. Other implementations, however, are possible.

The method 700 involves a UE terminal 104 receiving at least one power control parameter, such as base station parameters 602, from a base station 102, as shown in block 710. The base station parameters 602 can include, for example, a maximum power for one or more of a discovery signal, a sounding reference signal, a communication signal and/or a control signal. The maximum power can be an upper limit on the power that the UE terminal 104 can allocate to transmitting discovery signals, sounding reference signals, communication signals, and/or control signals used for D2D services.

The method 700 further involves the UE terminal 104 determining the transmission power 610 to be applied to signals used for D2D services, as shown in block 720. The processor 502 of the UE terminal 104 can execute the D2D power control module 508 to determine the transmission power 610. The D2D power control module 508 can determine the transmission power 610 based on at least one power control parameter received from the base station 102. In some embodiments, the D2D power control module 508 can determine the transmission power 610 based on one or more base station parameters 602 from the base station 102 as well as one or more UE parameters 604 and/or one or more OA&M parameters 606.

The D2D power control module 508 can determine the transmission power 610 by applying a power control function 608 using the maximum power for a signal used for D2D services, an initial power of the signal, and a power adjustment by the D2D power control module 508. A power control function 608 for determining the transmission power 610 can be represented by the formula $$P_{Tx} = \min(P_{Tx,Max}, P_0 + \Delta_P)$$

where $P_{Tx}$ is the transmission power 610, $P_{Tx,Max}$ is the maximum power that the UE terminal 104 can allocate for transmission, $P_0$ is a base value for the transmission power 610, and $\Delta_P$ is the adjustment to the transmission power 610. The power values for $P_{Tx}$, $P_{Tx,Max}$, $P_0$, and $\Delta_P$ can be in decibels or watts. The values for $P_{Tx}$, $P_{Tx,Max}$, $P_0$, and $\Delta_P$ can be determined based on base station parameters 602, as described below. In some embodiments, the values for $P_{Tx}$, $P_{Tx,Max}$, $P_0$, and $\Delta_P$ can be determined based on base station parameters 602 as well as one or more UE parameters 604 and/or more OA&M parameters 606.

In some embodiments, the maximum power that the UE terminal 104 can allocate to D2D discovery signals or other signals used for D2D service can be based on a minimum power threshold and a maximum power threshold, as represented by the function $$P_{Tx,Max\_L} \leq P_{Tx,Max} \leq P_{Tx,Max\_H}$$

where $P_{Tx,Max\_L}$ is the minimum power threshold and $P_{Tx,Max\_H}$ is the minimum power threshold. The minimum power threshold $P_{Tx,Max\_L}$ is the minimum transmission power 610 that can be used for D2D services based on performance requirements for the UE terminal 104. Non-limiting examples of performance requirements include a minimum or guaranteed transmission range, a bit error rate, a probability of detection, a probability of false alarm or other erroneous discovery of other UE terminals, a discovery delay requirement, etc.

The maximum power threshold $P_{Tx,Max\_H}$ can be determined based on one or more base station parameters 602, such as a maximum power set by a base station 102 or other network control device, and/or one or more UE parameters 604, such as a maximum power set by a user of a UE terminal 104, and/or a maximum power determined by the UE terminal 104 category. A UE terminal category can include one or more hardware specifications provided by a manufacturer of the UE terminal. In some embodiments, $P_{Tx,Max\_H}$ can be represented by the function $$P_{Tx,Max\_H} = \min(P_{eNB,Max}, P_{UE,Max}, P_{PowerClass})$$

$P_{eNB,Max}$ is a maximum power set by the base station 102. In some embodiments, the $P_{eNB,Max}$ can be a fixed value. In other embodiments, the $P_{eNB,Max}$ can be configured by the base station 102.

$P_{UE,Max}$ is a maximum power set by a user of the UE terminal 104 or an application executed at the UE terminal 104. A UE parameter 604 such as $P_{UE,Max}$ can provide flexibility in controlling the battery usage of the UE terminal 104 and can allow for greater re-use of time resources and/or frequency resources of the telecommunication system 100.

In some cases, the base station 102 failing to set $P_{eNB,Max}$ or the UE terminal 104 failing to set the $P_{UE,Max}$ such that $P_{eNB,Max}$ and/or $P_{UE,Max}$ have a value equal to zero, thereby resulting in $P_{Tx,Max}$ being erroneously set to 0. To prevent such errors, $P_{eNB,Max}$ and/or $P_{UE,Max}$ can have a default value of $P_{Max,Default}$. $P_{Max,Default}$ can be set to a fraction of the maximum power that the UE terminal 104 is permitted to use for uplink transmissions to the base station 102.

$P_{PowerClass}$ is an OA&M parameter 606 specifying a maximum transmission power for a device category of the UE terminal 104. The $P_{PowerClass}$ parameter may not be configurable. The $P_{PowerClass}$ parameter can be set by a core network, an operator using the telecommunication system 100, and/or a manufacturer of the UE terminal 104.

Applying a minimum-value operation in the formula for $P_{Tx,Max\_H}$ can prevent the maximum power set at the UE terminal 104 (i.e. $P_{UE,Max}$) from overriding or exceeding the maximum power set by base station 102 and/or defined by $P_{PowerClass}$.

In some embodiments, the minimum power threshold $P_{Tx,Max\_L}$ can be determined based on the upper power threshold $P_{Tx,Max\_H}$ and the maximum amount of power reduction that the UE terminal 104 can apply. For example, $P_{Tx,Max\_L}$ can be determined by the function $$P_{Tx,Max\_L} = P_{Tx,Max\_H} - \Delta.$$

where $\Delta$ (different from adjustment $\Delta_P$ above) is the maximum amount of power reduction that the UE terminal 104 can apply. In some embodiments, the value of $\Delta$ can be a base station parameter 602 configured by the base station 102. In other embodiments, the value of $\Delta$ can be an OA&M parameter 606 configured by a core network, an operator, and/or a manufacturer of the UE terminal 104.

In other embodiments, the maximum power value $P_{Tx,Max}$ that the UE terminal 104 can allocate to signals used for D2D services can be selected based on a single power parameter. For example, the maximum power can be set based on a parameter in a specification used by the UE terminal 104 and/or the base station 102, such as the parameter P-Max in the 3GPP specification that is used to limit a UE terminal's uplink transmission power to the maximum power set by the base station 102.

A power control module can select the initial power based on one or more power control parameters. In some embodiments, the initial power can be set by base station 102 or other network control device. In other embodiments, the initial power can be set by a user or an application executed by the UE terminal 104. In other embodiments, the initial power can be a fixed value set by the base station 102, by a manufacturer of a UE terminal 104, by an operator using the telecommunication system, etc.

In additional embodiments, the initial power can have a default value. The D2D power control module 508 may set the initial power based on an initial power value set by the base station 102 and an initial power value set by the UE terminal 104. In one example, the initial power can be represented by the formula $$P_0 = \min(P_{0,eNB}, P_{0,UE})$$

$P_{0,eNB}$ can be a value set by the base station 102 via higher layer signaling, such as (but not limited to) radio resource control ("RRC") signaling. If the UE terminal 104 is in an RRC Idle mode, the base station 102 can page the UE terminal 104 in order to change the state of the UE terminal 104 to RRC Connected prior to signaling for adjusting the power. $P_{0,UE}$ can be a value set by a user of the user, and/or the user, and/or an application. $P_{0,eNB}$ and $P_{0,UE}$ may take default values that are a non-zero fraction of $P_{Tx,Max}$. In some embodiments, the value of the $P_{0,UE}$ can be determined based on the received power of discovery signals transmitted by other devices and detected at the UE terminal 104.

Applying a minimum-value operation in the formula for $P_0$ can prevent the initial power from being set to a value exceeds the value set by a user of the UE terminal 104 or an application executed at the UE terminal 104.

In another example, the initial power can be represented by the formula:
$P_0 = P_{0,UE}$ if a user, the UE terminal 104, or an application executed at the UE terminal 104 sets $P_{0,UE}$, otherwise
$P_0 = P_{0,eNB}$ if the base station 102 sets the $P_{0,eNB}$, otherwise
$P_0 = \alpha P_{Tx,Max}$, for $0 \le \alpha \le 1$ In additional or alternative aspects, the initial power P0 can be defined by the P0,eNB parameter such that P0=P0,eNB.

In some embodiments, the power adjustment $\Delta P$ can be configured by a base station 102 or other network control device. In one example, the base station 102 or other network control device may signal a UE terminal 104 to adjust the power by a specified power adjustment. The specified power adjustment can be suggested by the base station 102 or other network control device or be a pre-determined value. In other embodiments, the power adjustment can be set by an application executed at a UE terminal 104.

In some embodiments, the power adjustment $\Delta P$ can be a scalar value. For a scalar value of $\Delta P$, the D2D power control module 508 can identify whether to increase the initial value of the transmission power 610 power by $\Delta P$ or decrease the initial value of the transmission power 610 by $\Delta_P$. For example, a power control function 608 for determining the transmission power 610 can be represented by the formula $$P_{Tx} = \min(P_{Tx,Max}, P_0 + \beta \Delta_P),$$

where $\beta$ takes values $\{-1, +1\}$.

In some embodiments, power adjustment $\Delta_P$ can be a vector value. A vector value of $\Delta_P$ can take positive or negative values. In one example, the values of $\Delta_P$ can be based on the value of $P_{Tx}$. For example
If $0 \le P_{Tx} \le T_1$ then $\Delta_P = \{a_1, a_2, \ldots, a_n\}$,
If $T_1 \le P_{Tx} \le T_2$ then $\Delta_P = \{b_2, \ldots, b_n\}, \ldots$.
The values of power adjustment $\Delta_P$ vector can be a function of its boundaries. For example:

$$a_i = T_1/2 + (i - n/2) \times T1/n, 1 \le i \le n,$$

$$b_i = (T_2 - T_1)/2 + (i - n/2)(T_2 - T_1/n, \ldots.$$

In another example, the power adjustment $\Delta_P$ can be independent of the $P_{Tx}$ or $P_0$. For example the power adjustment can have a value $\Delta_P = \{-c, c\}$.

In some aspects, $\Delta_P$ can be configured by base station 102. Any suitable mechanism can be used for adjusting the initial power $P_0$ by the power adjustment $\Delta_P$. In one example, the base station 102 may signal the UE terminal 104 to adjust the power. The value of $\Delta_P$ can be suggested by the base station 102 or can be pre-determined. In response to the D2D transmission causing an undesired interference at the base station 102 such that interference can be detected, the base station 102 can signal the UE terminal 104 to reduce the transmission power 610. Such signaling can be performed by transmitting a power adjustment $\Delta_P$ via, for example, a physical downlink control channel ("PDCCH") or via higher layer signaling.

In another example, the base station 102 can adjust the values for $P_{0,eNB}$ and $P_{Max,eNB}$.

In some aspects, $\Delta_P$ can also be configured by an application executed at the UE terminal 104, either directly or indirectly. For example the power adjustment $\Delta_P$ may be included in the set $\{-c, c\}$, in which c may be determined based on $P_{0,UE}$ and $P_{Max,UE}$. The determination of whether $\Delta_P = -c$ or $\Delta_P = c$ can be based on a random or pseudo random process, such as $\Delta_P = -c$ with a probability of 50% and $\Delta_P = c$ with a probability of 50%.

In additional or alternative aspects, the power adjustment $\Delta_P$ can be signaled as a separate power control loop between channels or signals related to D2D discovery or D2D communication. For example, a $\Delta_{P\_Disc}$ may be used for a discovery signal, and/or a $\Delta_{P\_Comm}$ may be used for a communication signal, and/or a $\Delta_{P\_SRS}$ may be used for a sounding reference signal.

In additional or alternative embodiments, a power control function 608 can be applied to determine the transmission power 610 based on a frequency bandwidth of a discovery signal 302, communication signal or other signal used for D2D services. To provide the same power spectral density for transmission of signals with different bandwidths, the bandwidth of a particular signal can be included in a power control function 608. An example of a power control function 608 for determining the transmission power 610 based on a frequency bandwidth can be represented by the formula $$P_{Tx} = \min(P_{Tx,Max}, P_0 + \Delta_P + f(\text{Bandwidth}))$$

where f(Bandwidth) is a bandwidth function that incorporates the effect of the bandwidth on the transmission power 610. An example of a bandwidth function can be loge function when all terms in the formula representing the power control function 608 are in decibels.

In additional or alternative embodiments, the power control for D2D discovery might be the same as, dependent on, or independent from D2D communication. If the power control for D2D discovery is the same as power control for D2D communication, then one set of parameters and configurations can be used for power control of both D2D discovery and D2D communication. If the power control for D2D discovery is the dependent one the power control for the D2D communication (or vice versa) then some of the parameters in the power control function, such as $P_{eNB,Max}$ and/or $P_{PowerClass}$ and/or $P_{0,eNB}$ may be the same, but a respective power control function for either D2D discovery or D2D communication may have different offset values.

In additional or alternative aspects, a power control function 608 for D2D communication can be related a power control function 608 for D2D discovery by the formula $$P_{TX,Comm} = P_{TX,Disc} + \Delta\_{offset} + (\text{other transmission-dependent parameters})$$

where $P_{TX,Disc}$ can be the same as or include $P_{Tx}$ formula described above.

If the power control for D2D discovery is independent from the power control for D2D communication, a power control function 608 for each respective D2D phase may require base station parameters 602 and/or OA&M parameters 606.

In additional or alternative aspects, the power control function 608 can include additional parameters to determine the transmission power 610. Additional parameters can include, for example, a path loss compensation factor, a coding and modulation factor, etc. For example, the UE terminal 104 may measure a path loss or other signal power degradation in a D2D communication link or signaling path. The UE terminal 104 can notify the base station 102 of the path loss or other signal power degradation. The base station 102 can modify one or more the base station parameters 602 to allow the UE terminal 104 to compensate for the path loss or other signal power degradation.

The method 700 further involves the UE terminal 104 transmitting the signal used for D2D services using the transmission power, as shown in block 730. The signal transceiver module 510 of the UE terminal 104 can transmit one or more signals for D2D services.

General Considerations

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

Any logic or application described herein that comprises software or code can be embodied in any non-transitory computer-readable medium for use by or in connection with a computing system such as, for example, a processor in a computer system or other system. In this sense, the logic may comprise, for example, statements including instructions and declarations that can be fetched from the computer-readable medium and executed by a computing system.

In the context of the present disclosure, a "computer-readable medium" can include any medium that can contain, store, maintain, or otherwise include the logic or application described herein for use by or in connection with a computing system. The computer-readable medium can comprise any one of many physical media such as, for example, magnetic, optical, or semiconductor media. More specific examples of a suitable computer-readable medium can include, but are not limited to, magnetic tapes, magnetic floppy diskettes, magnetic hard drives, memory cards, solid-state drives, USB flash drives, optical discs, etc. The computer readable medium may be a random access memory ("RAM"). Examples of a RAM can include (but are not limited to) static random access memory ("SRAM"), dynamic random access memory ("DRAM"), magnetic random access memory ("MRAM"), etc. The computer-readable medium may be a read-only memory ("ROM"), a programmable read-only memory ("PROM"), an erasable programmable read-only memory ("EPROM"), an electrically erasable programmable read-only memory ("EEPROM"), or other type of memory device.

It should be emphasized that the above-described examples are merely possible implementations set forth for a clear understanding of the principles of the disclosure. Many variations and modifications may be made to the above-described examples without departing substantially from the spirit and principles of the disclosure. All such modifications and variations are intended to be included herein within the scope of this disclosure and protected by the following claims.

The invention claimed is:

1. A user equipment terminal, comprising:
a first power control module configured to control a first transmission power to be applied to at least one signal used for communication between the user equipment terminal and a base station, wherein the first transmission power is determined based on at least one first power control parameter received from the base station;
a second power control module configured to control a second transmission power to be applied to at least one signal used for device-to-device services, wherein the second power control module is configured to determine the second transmission power from the minimum of (i) a maximum power for the at least one signal used for device-to-device services and (ii) a transmission power based on a frequency bandwidth for the at least one signal used for device-to-device services, wherein the user equipment terminal is configured to determine the maximum power based on at least one second power control parameter received from the base station; and
a signal transceiver module configured to transmit the at least one signal used for communication between the user equipment terminal and the base station using the first transmission power and to transmit the at least one signal used for device-to-device services using the second transmission power.

2. The user equipment terminal of claim 1, wherein the at least one second power control parameter is independent from the at least one first power control parameter.

3. The user equipment terminal of claim 1, wherein the second power control module is further configured for controlling the second transmission power based on one or more user equipment parameters.

4. The user equipment terminal of claim 1, wherein the second power control module is further configured for controlling the second transmission power based on one or more Operations, Administration, and Maintenance parameters.

5. A system comprising a processor configured to execute one or more modules embodied in a non-transitory computer-readable medium, the one or more modules comprising:
a first power control module configured to control a first transmission power to be applied to at least one signal used for communication between a user equipment terminal and a base station, wherein the first transmission power is determined based on at least one first power control parameter; and
a second power control module configured to control a second transmission power to be applied to at least one signal used for device-to-device services, wherein the second power control module is configured to determine the second transmission power from the minimum of (i) a maximum power for the at least one signal used for device-to-device services and (ii) a transmission power based on a frequency bandwidth for the at least one signal used for device-to-device services, wherein the system is configured to determine the maximum power from at least one second power control parameter.

6. The system of claim 5, wherein the at least one second power control parameter is independent from the at least one first power control parameter.

7. The system of claim 5, wherein the second power control module is further configured for controlling the second transmission power based on one or more user equipment parameters.

8. The system of claim 5, wherein the second power control module is further configured for controlling the second transmission power based on one or more Operations, Administration, and Maintenance parameters.

9. A base station, comprising:
a first power control module configured to control a first transmission power to be applied to at least one signal used for communication between a user equipment terminal and the base station wherein the base station is configured to determine the first transmission power based on at least one first power control parameter which is transmitted from the base station to the user equipment terminal;
a second power control module configured to control a second transmission power to be applied to at least one signal used by the user equipment terminal for device-to-device services, wherein the second power control module is configured to determine the second transmission power from the minimum of (i) a maximum power for the at least one signal used for device-to-device services and (ii) a transmission power based on a frequency bandwidth for the at least one signal used for device-to-device services, wherein base station is configured to determine the maximum power based on at least the one second power control parameter which is transmitted from the base station to the user equipment terminal; and
a signal transceiver module configured to transmit the at least one first power control parameter and to transmit the at least one second power control parameter to the user equipment terminal.

10. The base station of claim 9, wherein the at least one first power control parameter is independent from the at least one second power control parameter.

11. A method performed by a user equipment terminal, the method comprising:
controlling a first transmission power to be applied to at least one signal used for communication between the user equipment terminal and a base station, wherein the first transmission power is determined based on at least one first power control parameter received from the base station;
controlling a second transmission power to be applied to at least one signal used for device-to-device services, wherein the second transmission power is determined from the minimum of (i) a maximum power for the at least one signal used for device-to-device services and (ii) a transmission power based on a frequency bandwidth for the at least one signal used for device-to-device services, wherein the maximum power is determined based on the at least one power control parameter;
transmitting, by the user equipment terminal, the at least one signal used for communication between the user equipment terminal and the base station using the first transmission power; and
transmitting, by the user equipment terminal, the at least one signal used for device-to-device services using the second transmission power.

12. The method of claim 11, wherein the at least one second power control parameter is independent from the at least one first power control parameter.

13. The method of claim 11, wherein the second transmission power is determined based on one or more user equipment parameters in addition to the at least second one power control parameter received from the base station.

14. The method of claim 11, wherein the second transmission power is determined based on one or more Operations, Administration, and Maintenance parameters in addition to the at least second one power control parameter received from the base station.

15. A method performed by a base station, comprising:
controlling a first transmission power to be applied to at least one signal used for communication between a user equipment terminal and the base station, wherein the first transmission power is determined based on at least one first power control parameter that is transmitted from the base station to the user equipment terminal;
controlling a second transmission power to be applied to at least one signal used by the user equipment terminal for device-to-device services, wherein the second transmission power is determined from the minimum of (i) a maximum power for the at least one signal used for device-to-device services and (ii) a transmission power based on a frequency bandwidth for the at least one signal used for device-to-device services, wherein the maximum power is determined based on at least the one second power control parameter that is transmitted from the base station to the user equipment terminal;
transmitting the at least one first power control parameter; and
transmit the at least one second power control parameter to the user equipment terminal.

16. The method of claim 15, wherein the at least one second power control parameter is independent from the at least one first power control parameter.

17. The method of claim 15, wherein the second transmission power is determined based on one or more user equipment parameters in addition to the at least second one power control parameter received from the base station.

18. The method of claim 15, wherein the second transmission power is determined based on one or more Operations, Administration, and Maintenance parameters in addition to the at least second one power control parameter received from the base station.

* * * * *